United States Patent
Alletto, Jr.

(10) Patent No.: US 12,077,647 B2
(45) Date of Patent: Sep. 3, 2024

(54) FIBER COMBINATION

(71) Applicant: BEDGEAR, LLC, Farmingdale, NY (US)

(72) Inventor: Eugene Alletto, Jr., Glen Head, NY (US)

(73) Assignee: Bedgear, LLC, Farmingdale, NY (US)

( * ) Notice: Subject to any disclaimer, the term of this patent is extended or adjusted under 35 U.S.C. 154(b) by 0 days.

(21) Appl. No.: 16/036,249

(22) Filed: Jul. 16, 2018

(65) Prior Publication Data

US 2019/0023861 A1    Jan. 24, 2019

Related U.S. Application Data

(60) Provisional application No. 62/533,920, filed on Jul. 18, 2017.

(51) Int. Cl.
| | |
|---|---|
| *A47C 27/22* | (2006.01) |
| *A47G 9/10* | (2006.01) |
| *B68G 1/00* | (2006.01) |
| *C08J 9/00* | (2006.01) |
| *D01G 9/08* | (2006.01) |
| *D04H 1/02* | (2006.01) |
| *D04H 1/4274* | (2012.01) |
| *D04H 1/435* | (2012.01) |
| *D06M 15/643* | (2006.01) |
| *D06M 101/32* | (2006.01) |

(52) U.S. Cl.
CPC ............. *C08J 9/0085* (2013.01); *B68G 1/00* (2013.01); *C08J 9/0023* (2013.01); *C08J 9/0061* (2013.01); *D01G 9/08* (2013.01); *D04H 1/02* (2013.01); *D04H 1/4274* (2013.01); *D04H 1/435* (2013.01); *D06M 15/643* (2013.01); *A47C 27/22* (2013.01); *A47G 9/10* (2013.01); *A47G 2009/1018* (2013.01); *C08J 2375/04* (2013.01); *D06M 2101/32* (2013.01); *D10B 2331/04* (2013.01); *D10B 2503/06* (2013.01)

(58) Field of Classification Search
CPC .. A47C 27/22; A47G 2009/1018; A47G 9/10; B68G 11/02; B68G 11/03; C08J 9/0085; D10B 2331/04
See application file for complete search history.

(56) References Cited

U.S. PATENT DOCUMENTS

| | | | |
|---|---|---|---|
| 3,403,203 A | 9/1968 | Schirmer | |
| 3,449,058 A | 6/1969 | Hellman et al. | |
| 3,824,142 A | 7/1974 | Gross et al. | |
| 3,900,648 A * | 8/1975 | Smith | A47C 27/22 5/636 |
| 4,758,466 A * | 7/1988 | Dabi | A61L 15/425 442/338 |
| 5,061,737 A | 10/1991 | Hudson | |
| 5,350,625 A | 9/1994 | Peterson et al. | |
| 6,783,853 B2 | 8/2004 | Figuly et al. | |
| 7,484,256 B2 | 2/2009 | Murphy et al. | |
| 7,752,681 B2 | 7/2010 | Michel | |
| 9,357,863 B1 | 6/2016 | Goenka | |
| 2004/0186405 A1 | 9/2004 | Pinna et al. | |
| 2005/0245164 A1 | 11/2005 | Aneja et al. | |
| 2006/0160451 A1 | 7/2006 | Dry et al. | |
| 2006/0272100 A1 | 12/2006 | Barberis | |
| 2007/0107662 A1 | 5/2007 | Queen et al. | |
| 2007/0251276 A1 | 11/2007 | D'Ottaviano et al. | |
| 2008/0075915 A1* | 3/2008 | Wening | A47G 27/0468 428/95 |
| 2008/0254263 A1 | 10/2008 | Yasui et al. | |
| 2009/0199341 A1 | 8/2009 | Schantz | |
| 2010/0261397 A1 | 10/2010 | Sabourin et al. | |
| 2011/0212658 A1 | 9/2011 | Vandeplancke et al. | |
| 2012/0255128 A1 | 10/2012 | Sytz | |
| 2013/0017747 A1 | 1/2013 | Giloh et al. | |
| 2014/0053341 A1 | 2/2014 | Parvin | |
| 2014/0068868 A1 | 3/2014 | Morzano et al. | |
| 2015/0044393 A1* | 2/2015 | Uretsky | B68G 1/00 428/6 |
| 2017/0071370 A1 | 3/2017 | Casali | |

FOREIGN PATENT DOCUMENTS

| | | |
|---|---|---|
| EP | 2208445 A1 | 7/2010 |
| EP | 3066963 A1 | 9/2016 |
| WO | 2016154402 A1 | 9/2016 |

OTHER PUBLICATIONS

PCT/US2017/017430 International Search Report and Written Opinion of the International Searching Authority—European Patent Office mailed Oct. 12, 2018.
International Search Report and Written Opinion of the International Searching Authority, European Patent Office, PCT/US2018/042262, mailed Jan. 30, 2020.

* cited by examiner

*Primary Examiner* — Melissa A Rioja
(74) *Attorney, Agent, or Firm* — Sorell, Lenna & Schmidt, LLP

(57) ABSTRACT

A cushioning material includes fibers that define a fiber network and a foam material suspended within the fiber network.

18 Claims, 7 Drawing Sheets

FIBER COMBINATION

TECHNICAL FIELD

The present disclosure generally relates to cooling fiber combinations, and more particularly to cushioning materials having a foam suspended in a fiber network. Methods of use are included.

BACKGROUND

Sleep is critical for people to feel and perform their best, in every aspect of their lives. Sleep is an essential path to better health and reaching personal goals. Indeed, sleep affects everything from the ability to commit new information to memory to weight gain. It is therefore essential for people to use bedding that suit both their personal sleep preference and body type in order to achieve comfortable, restful sleep.

Selecting the appropriate type of bedding is an important aspect in achieving proper sleep. For example, selecting a pillow, mattress, mattress topper, etc. having a selected amount of firmness can greatly affect how comfortable a user is when they sleep. The firmness in such bedding may be controlled by selecting bedding having cushioning material that provides a desired firmness. Cushioning materials may be formulated and/or configured to reduce peak pressure on the sleeper's body, which may increase comfort. Cushioning materials may be formed of materials that compress, deflect or deform under load, such as, for example, various foams or gels. Different cushioning materials may have different responses to a given pressure. However, most conventional cushioning materials used in bedding are known to trap heat within the article of bedding, thus causing the sleeper discomfort, which can prevent restful sleep. This disclosure describes an improvement over these prior art technologies.

SUMMARY

In one embodiment, in accordance with the principles of the present disclosure, a cushioning material is provided that includes fibers that define a fiber network and a foam material suspended within the fiber network. In some embodiments, the fiber network is made randomly by separating a portion of fibrous cushion apart to create a fiber network. The amount of separation the fibrous cushion results in various levels of networking. In some embodiments, the fibers are knitted to form the fiber network. In some embodiments, the fibers are braided to form the fiber network. In some embodiments, the fibers are twisted to form the fiber network. In some embodiments, the fibers are woven to form the fiber network. In some embodiments, the fibers are non-woven. In some embodiments, the foam material is permanently suspended within the fiber network. In some embodiments, the fibers comprise polyester. In some embodiments, the fibers have a denier between about 0.9D and about 2.8D. In some embodiments, the foam material comprises latex, polyurethane and/or viscoelastic polyurethane. In some embodiments, the foam material comprises chunks having a diameter between about 1.0 inch and about 1.5 inches. In some embodiments, the foam material has a density between 1.8 lbs/ft$^3$ and 4.8 lbs/ft$^3$.

In one embodiment, in accordance with the principles of the present disclosure, a method of making a cushioning material is provided that includes opening fibers to form a fiber network and blending a foam material with the fiber network such that the foam material is suspended within the fiber network. In some embodiments, opening the fibers comprises completely opening the fibers. In some embodiments, opening the fibers allows free movement of the fibers around one another.

BRIEF DESCRIPTION OF THE DRAWINGS

The present disclosure will become more readily apparent from the specific description accompanied by the following drawings, in which.

DETAILED DESCRIPTION

Figure 1:
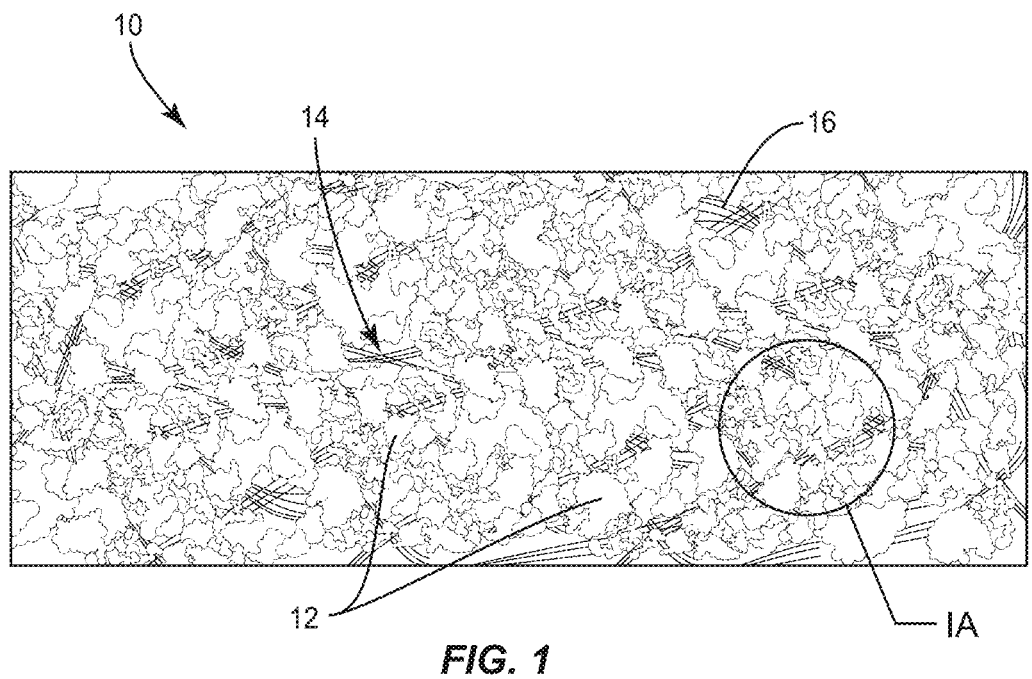
FIG. 1 is a perspective view of one embodiment of a cushioning material in accordance with the present principles of the present disclosure.
Figure 1A:
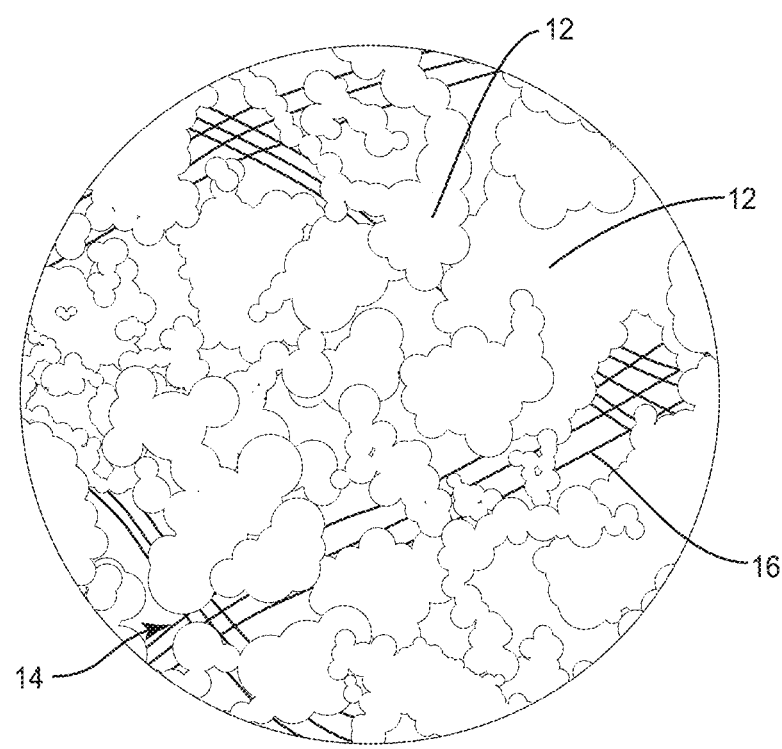
FIG. 1A is an enlarged, close up view of the cushioning material shown in FIG. 1.
Figure 2A:
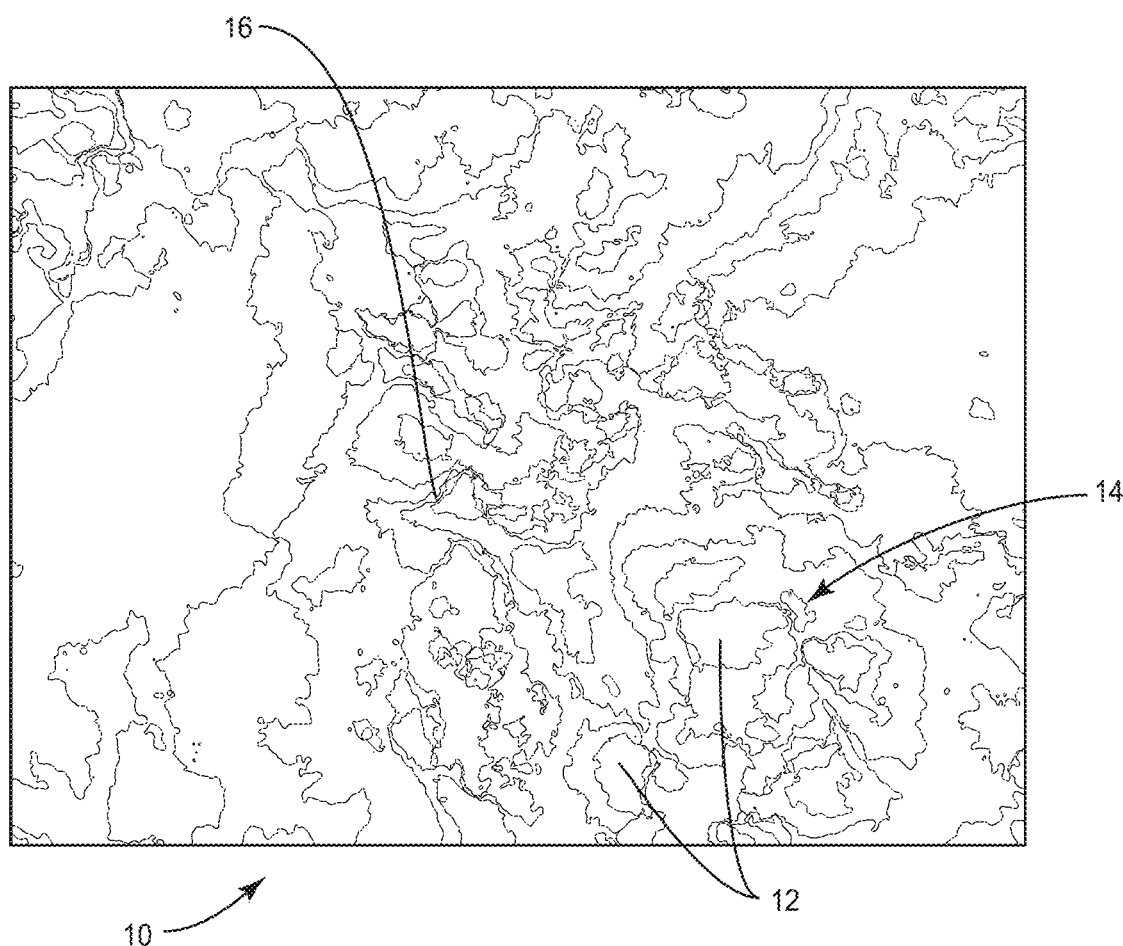
FIG. 2A is a perspective view of one embodiment of a cushioning material in accordance with the present principles of the present disclosure.
Figure 2B:
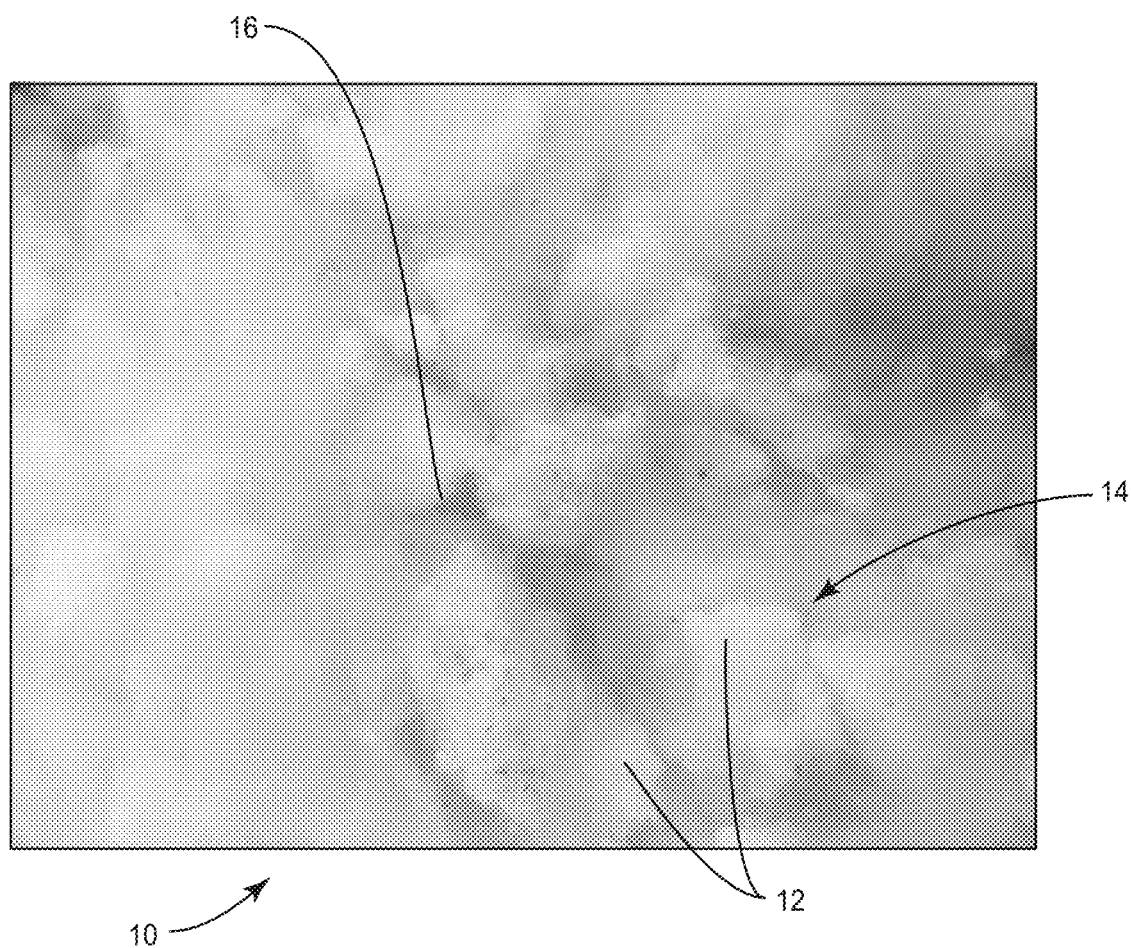
FIG. 2B is a photograph of the cushioning material shown in FIG. 2A, illustrating details of the cushioning material that are not clearly discernable in FIG. 2A.
Figure 3A:
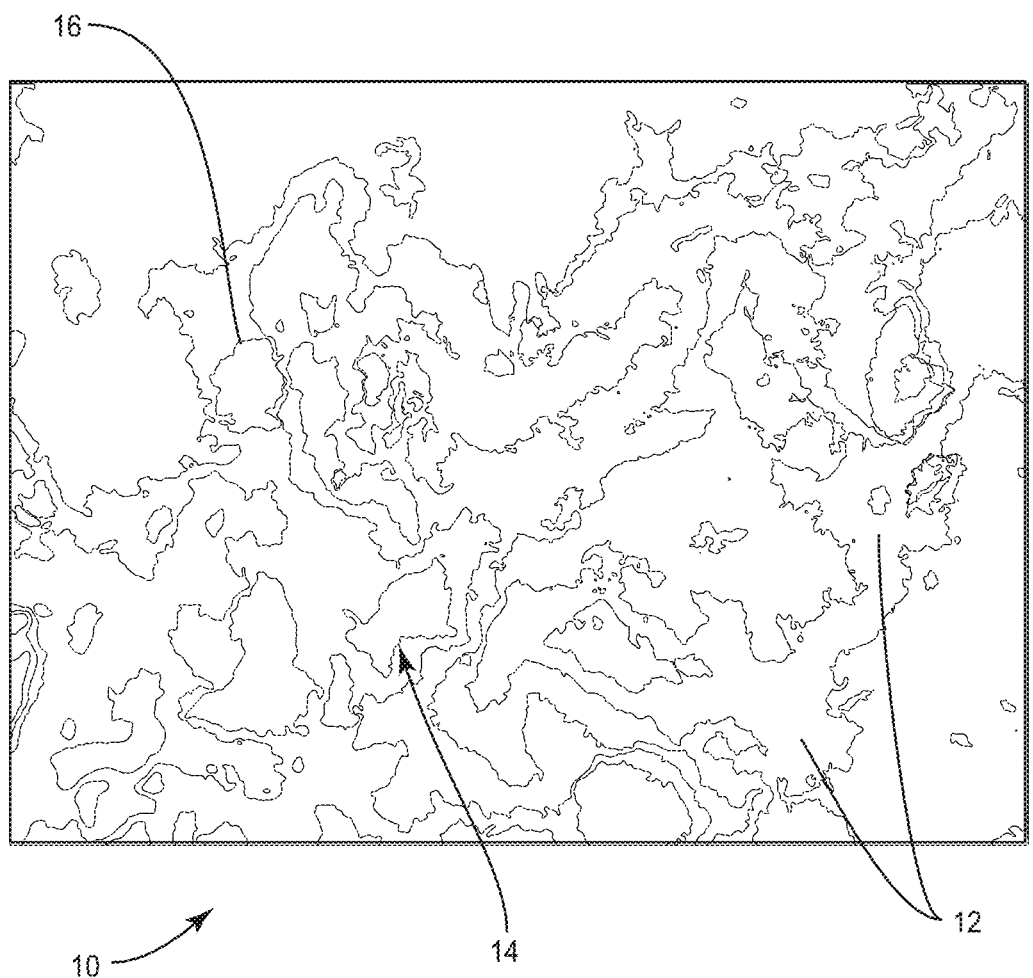
FIG. 3A is a perspective view of one embodiment of a cushioning material in accordance with the present principles of the present disclosure.
Figure 3B:
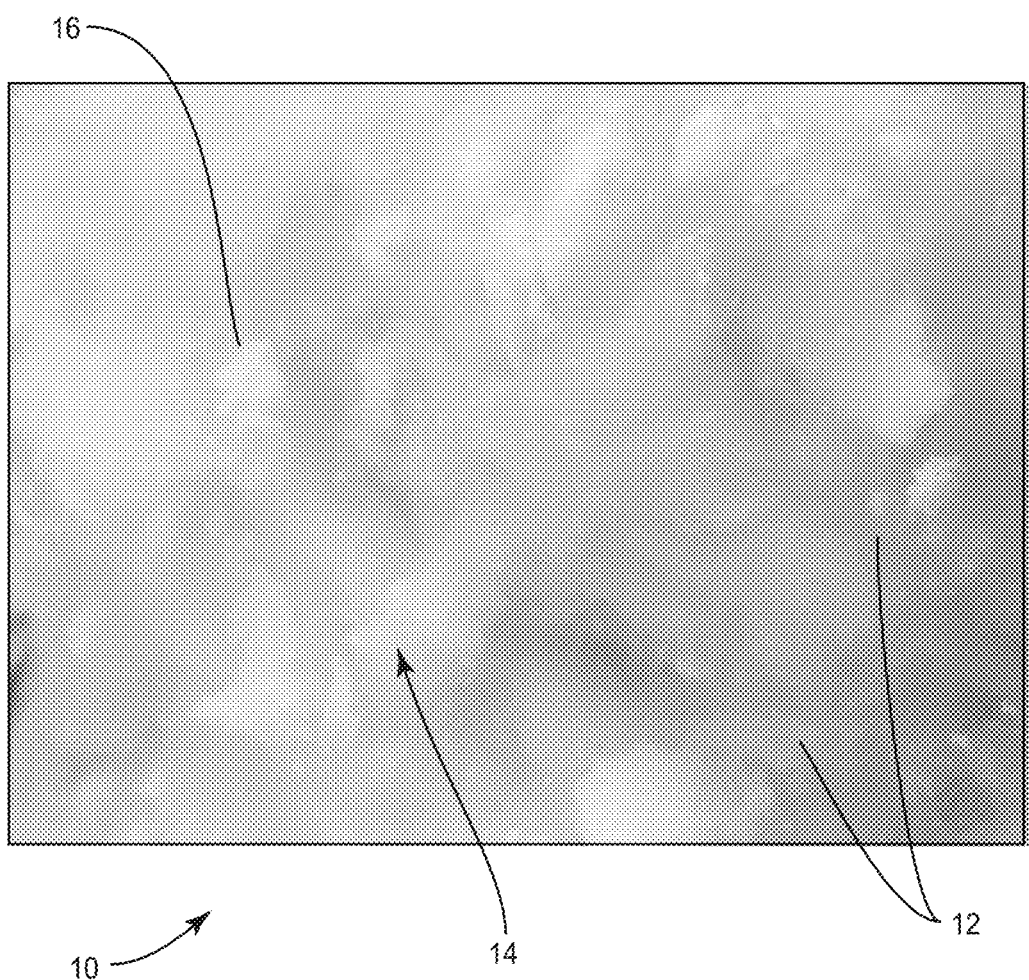
FIG. 3B is a photograph of the cushioning material shown in FIG. 3A, illustrating details of the cushioning material that are not clearly discernable in FIG. 3A.

The exemplary embodiments of cushioning materials and methods of making cushioning materials are discussed in terms of cushioning materials having a foam material suspended in a fiber network that provide a cooling effect when used as a cushioning or fill material in bedding, such as, for example, pillows, mattresses, mattress toppers, etc. The present disclosure may be understood more readily by reference to the following detailed description of the disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of cushioning material 10 having a foam material 12 suspended in a fiber network 14 that provides a cooling effect when used as a cushioning or fill material in bedding in accordance with the principles of the present disclosure. Alternate embodiments are also disclosed. Reference will now be made in detail to the exemplary embodiments of the present disclosure.

The components of cushioning material 10 can be fabricated from materials including polymers and/or composites, depending on the particular application. For example, cushioning material 10 can be fabricated from materials such as fabrics or textiles, paper or cardboard, cellulosic-based materials, biodegradable materials, plastics and other polymers, semi-rigid and rigid materials. Cushioning material 10 may also be fabricated from a heterogeneous material such as a combination of two or more of the above-described materials. Cushioning material 10 can be extruded, molded, injection molded, cast, pressed and/or machined.

In one embodiment, cushioning material 10 includes staple fibers 16 from a bale that are opened to space fibers 16 apart from one another and create fiber network 14. Foam material 12 is blended with fiber network 14 to suspend foam material 12 within fiber network 14. Foam material 12 becomes entangled within fiber network 12 when foam material 12 is blended with fiber network 14. In some embodiments, the entangled foam is positioned within the network and is able to move within a limited range but not dislodge from its position within the network. This gives the pillow a unique feel and adjustability while maintaining the pillows shape, form and characteristics.

In some embodiments, fibers 16 are treated to maintain foam material 12 within fiber network 14. For example, fibers 16 may be coated with a siliconized material and/or can comprise a siliconized material. It is envisioned that the siliconized material maintains contact between fibers 16 and foam material 12 to maintain foam material 12 within fiber network 14. Fibers 16 form fiber network 14 by opening fibers 16 to space fibers 16 apart from other fibers 16. For example, fibers 16 can be opened by blowing air to separate fibers 16. This allows fibers 16 to form fiber network 14 with minimal amount of processing and/or manipulation. For example, because the siliconized material on fibers 16 maintain foam material 12 within fiber network 14, there is no need to crimp or otherwise further process or manipulate fibers 16 to maintain foam material 12 within fiber network 14. Indeed, fibers 16 may include straight type fibers and may be either synthetic or a natural material.

In some embodiments, fibers 16 comprise a polyester material. In some embodiments, fibers 16 comprise a conjugate material. In some embodiments, fibers 16 comprise a conjugate material having a denier from about 1D to about 30D. In some embodiments, fibers 16 comprise a conjugate material having a denier from about 10D to about 14D. In some embodiments, fibers 16 comprise a conjugate material having a denier of 12D. In some embodiments, fibers 16 comprise a conjugate material having a denier from about 2D to about 4D. In some embodiments, fibers 16 comprise a conjugate material having a denier of 2.8D. In some embodiments, fibers 16 comprise a micro fiber slick material. In some embodiments, fibers 16 comprise a micro fiber slick material having a denier from about 0.1D to about 2.0D. In some embodiments, fibers 16 comprise a micro fiber slick material having a denier from about 0.75D to about 1.0D. In some embodiments, fibers 16 comprise a micro fiber slick material having a denier of 0.9D. In some embodiments, fibers 16 comprise a hollow material. In some embodiments, fibers 16 comprise a hollow material having a denier from about 2D to about 10D. In some embodiments, fibers 16 comprise a hollow material having a denier from about 5D to about 7D. In some embodiments, fibers 16 comprise a hollow material having a denier of 6D.

In some embodiments, staple fibers 16 from the bale are opened by blowing air to separate fibers 16. In some embodiments, staple fibers 16 from the bale are opened by mechanically separating fibers 16. In some embodiments, staple fibers 16 from the bale are twisted and are opened by untwisting fibers 16. In some embodiments, staple fibers 16 from the bale are opened by other means known in the art that results in fibers 16 being spaced apart from one another.

In some embodiments, fibers 16 comprise a non-elastic material. In some embodiments, fibers 16 comprise a non-elastomeric material. In some embodiments, fibers 16 comprise polyester. In some embodiments, fibers 16 comprise a polymeric material, such as, for example, one or more of polymer selected from the group consisting of polylactic acid, polyglycolic acid, poly(L-lactide) (PLLA), poly(D,L-lactide) (PLA) polyglycolic acid [polyglycolide (PGA)], poly(L-lactide-co-D,L-lactide) (PLLA/PLA), poly(L-lactide-co-glycolide) (PLLA/PGA), poly(D, L-lactide-co-glycolide) (PLA/PGA), poly(glycolide-co-trimethylene carbonate) (PGA/PTMC), poly(D,L-lactide-co-caprolactone) (PLA/PCL), poly(glycolide-co-caprolactone) (PGA/PCL), poly(oxa)esters, polyethylene oxide (PEO), polydioxanone (PDS), polypropylene fumarate, polyethyl glutamate-co-glutamic acid), poly(tert-butyloxy-carbonylmethyl glutamate), polycaprolactone (PCL), polycaprolactone co-butylacrylate, polyhydroxybutyrate (PHBT), polyhydroxybutyrate, poly(phosphene), poly(phosphate ester), poly(amino acid), polydepsipeptides, polyiminocarbonates, poly[(97.5% dimethyl-trimethylene carbonate)-co-(2.5% trimethylene carbonate)], poly(orthoesters), polyethylene terephthalate (PET), polyalkylene oxides, and hydroxypropylmethylcellulose.

In some embodiments, foam material 12 comprises polyurethane foam, polyurethane memory foam, natural latex foam rubber, synthetic latex foam rubber, a foamed blend of natural and synthetic rubbers, foamed polyolefin (e.g., foamed polyethylene), or a combination thereof. Foam material 12 may be in the form of chunks or chips. In some embodiments, foam material 12 is graded based on density. In some embodiments, foam material 12 has a density from about 0.5 lbs/ft$^3$ to about 7.0 lbs/ft$^3$. In some embodiments, foam material 12 has a density from about 1.5 lbs/ft$^3$ to about 5.0 lbs/ft$^3$. In some embodiments, foam material 12 has a density from 1.8 lbs/ft$^3$ to 4.8 lbs/ft$^3$. In some embodiments, foam material 12 has a density from 2.7 lbs/ft$^3$ to 4.4 lbs/ft$^3$. In some embodiments, foam material 12 is graded to limit the size of foam material 12. For example, chunks or chips of foam material 12 may be graded to exclude chunks or chips that exceed a selected diameter. In some embodiments, foam material 12 includes different sizes of chunks or chips. For example, in one embodiment, foam material 12 includes chunks or chips having an average diameter of about 1 inch to about 2 inches, chunks or chips having an average diameter of about 0.5 inches to about 0.75 inches, and chunks or chips having an average diameter of about 0.1 inches to about 0.25 inches. It is envisioned that providing cushioning material 10 with foam material 12 having chunks or chips of different sizes allows air to move between the chunks or chips through fiber network 14 in a manner that provides a cooling effect and/or prevents heat buildup within cushioning material 10. In some embodiments, foam material 12 includes chips or chunks that have only smooth surfaces. That is, the chips or chunks lack any jagged or ragged edges. In some embodiments, foam material 12 includes chips or chunks that are precisely cut into cuboid or other geometrical shapes.

In some embodiments, foam material 12 consists of latex foam and fibers 16 consist of polyester fiber. In some embodiments, foam material 12 consists of viscoelastic polyurethane foam and fibers 16 consist of polyester fiber. In some embodiments, the polyester fibers are coated or otherwise treated with a siliconized material, as discussed herein. Cushioning material 10 may include any ratio of foam material 12 to fibers 16. In some embodiments, cushioning material 10 comprises about 1% to about 99% foam material 12 and about 1% to about 99% fibers 16 by volume. In some embodiments, cushioning material 10 comprises about 10% to about 40% foam material 12 and about 60% to about 90% fibers 16 by volume. In some embodiments, cushioning material 10 comprises about 60% to about 90% foam material 12 and about 10% to about 40% fibers 16 by volume. In some embodiments, cushioning material 10 comprises about 20% foam material 12 and about 80% fibers 16 by volume. In some embodiments, cushioning material 10 comprises about 30% foam material 12 and about 70% fibers 16 by volume. In some embodiments, cushioning material 10 comprises about 80% foam material 12 and about 20% fibers 16 by volume. In some embodiments, cushioning material 10 comprises about 70% foam material 12 and about 30% fibers 16 by volume.

In one embodiment, foam material 12 comprises latex foam and fibers 16 comprise 12D conjugate fibers, micro fiber 0.9D slick fibers and 6D hollow fibers. In some embodiments, cushioning material 10 comprises 20% to 90% of foam material 12 by volume and cushioning material 10 comprises 10% to 80% of the 12D conjugate fibers, the micro fiber 0.9D slick fibers and the 6D hollow fibers by volume. In some embodiments, cushioning material 10 comprises 84% of foam material 12 by volume, cushioning material 10 comprises 8% of the 12D conjugate fibers by volume, cushioning material 10 comprises 4% of the micro fiber 0.9D slick fibers by volume and cushioning material 10 comprises 4% of the 6D hollow fibers by volume. In some embodiments, cushioning material 10 comprises 84% of foam material 12 by volume, 8% of the 12D conjugate fibers by volume, 5% of the micro fiber 0.9D slick fibers by volume and 3% of the 6D hollow fibers by volume.

In one embodiment, foam material 12 comprises latex foam and fibers 16 comprise micro fiber 0.9D slick fibers, wherein cushioning material 10 comprises 20% to 90% of foam material 12 by volume and 10% to 80% of the micro fiber 0.9D slick fibers by volume. In one embodiment, foam material 12 comprises latex foam and fibers 16 comprise micro fiber 0.9D slick fibers, wherein cushioning material 10 comprises 70% of foam material 12 by volume and 30% of the micro fiber 0.9D slick fibers by volume. In one embodiment, foam material 12 comprises latex foam and fibers 16 comprise micro fiber 0.9D slick fibers, wherein cushioning material 10 comprises 75% of foam material 12 by volume and 25% of the micro fiber 0.9D slick fibers by volume. In one embodiment, foam material 12 comprises latex foam and fibers 16 comprise micro fiber 0.9D slick fibers, wherein cushioning material 10 comprises 85% of foam material 12 by volume and 15% of the micro fiber 0.9D slick fibers by volume. In one embodiment, foam material 12 comprises latex foam and fibers 16 comprise micro fiber 0.9D slick fibers, wherein cushioning material 10 comprises 20% of foam material 12 by volume and 80% of the micro fiber 0.9D slick fibers by volume.

In one embodiment, foam material 12 comprises latex foam and fibers 16 comprise micro fiber 0.9D slick fibers, wherein cushioning material 10 comprises 35% of foam material by volume and 65% of the micro fiber 0.9D slick fibers by volume. In one embodiment, foam material 12 comprises latex foam and fibers 16 comprise micro fiber 0.9D slick fibers, wherein cushioning material 10 comprises 25% of foam material 12 by volume and 75% of the micro fiber 0.9D slick fibers by volume. In one embodiment, foam material 12 comprises latex foam and fibers 16 comprise micro fiber 0.9D slick fibers, wherein cushioning material 10 comprises 90% of foam material 12 by volume and 10% of the micro fiber 0.9D slick fibers by volume. In one embodiment, foam material 12 comprises latex foam and fibers 16 comprise micro fiber 0.9D slick fibers, wherein cushioning material 10 comprises 80% of foam material 12 by volume and 20% of the micro fiber 0.9D slick fibers by volume. In one embodiment, foam material 12 comprises latex foam and fibers 16 comprise micro fiber 0.9D slick fibers, wherein cushioning material 10 comprises 60% of foam material 12 by volume and 40% of the micro fiber 0.9D slick fibers by volume.

In one embodiment, foam material 12 comprises latex foam and fibers 16 comprise 2.8D conjugate fibers, wherein cushioning material 10 comprises 25% to 80% of foam material 12 by volume and 20% to 75% of the 2.8D conjugate fibers by volume. In one embodiment, foam material 12 comprises latex foam and fibers 16 comprise 2.8D conjugate fibers, wherein cushioning material 10 comprises 50% of foam material 12 by volume and 50% of the 2.8D conjugate fibers by volume. In one embodiment, foam material 12 comprises latex foam and fibers 16 comprise 2.8D conjugate fibers, wherein cushioning material 10 comprises 80% of foam material 12 by volume and 20% of the 2.8D conjugate fibers by volume. In one embodiment, foam material 12 comprises latex foam and fibers 16 comprise 2.8D conjugate fibers, wherein cushioning material 10 comprises 25% of foam material 12 by volume and 75% of the 2.8D conjugate fibers by volume.

In one embodiment, foam material 12 comprises viscoelastic polyurethane foam and fibers 16 comprise micro fiber 0.9D slick fibers, wherein cushioning material 10 comprises 30% to 80% of foam material 12 by volume and 20% to 70% of the micro fiber 0.9D slick fibers by volume. In one embodiment, foam material 12 comprises viscoelastic polyurethane foam and fibers 16 comprise micro fiber 0.9D slick fibers, wherein cushioning material 10 comprises 75% of foam material 12 by volume and 25% of the micro fiber 0.9D slick fibers by volume.

In one embodiment, foam material 12 comprises viscoelastic polyurethane foam and fibers 16 comprise micro fiber 0.9D slick fibers, wherein cushioning material 10 comprises 70% of foam material 12 by volume and 30% of the micro fiber 0.9D slick fibers by volume. In one embodiment, foam material 12 comprises viscoelastic polyurethane foam and fibers 16 comprise micro fiber 0.9D slick fibers, wherein cushioning material 10 comprises 60% of foam material 12 by volume and 40% of the micro fiber 0.9D slick fibers by volume. In one embodiment, foam material 12 comprises viscoelastic polyurethane foam and fibers 16 comprise micro fiber 0.9D slick fibers, wherein cushioning material 10 comprises 80% of foam material 12 by volume and 20% of the micro fiber 0.9D slick fibers by volume. In one embodiment, foam material 12 comprises viscoelastic polyurethane foam and fibers 16 comprise micro fiber 0.9D slick fibers, wherein cushioning material 10 comprises 30% of foam material 12 by volume and 70% of the micro fiber 0.9D slick fibers by volume.

Foam material 12 is suspended within fiber network 14 in a manner that maintains separation between chips or chunks of foam material 12. That is, the chips or chunks of foam material 12 are separated from other chips or chunks of foam material 12 by fiber network 14 to maintain pockets of air between adjacent chips or chunks of foam material 12. This configuration allows air to move between adjacent chips or chunks of foam material 12 to prevent heat from building up within cushioning material 10. Fiber network 14 adds bounce or loft to cushioning material 10 that prevents adjacent chips or chunks of foam material 12 from contacting one another when weight is applied to cushioning material 10, for example. As such, air is permitted to move between adjacent chips or chunks of foam material 12 to prevent heat from building up within cushioning material 10, even when weight is applied to cushioning material 10. This configuration imparts breathability to cushioning material 10 that allows air to move through cushioning material 10. Fiber network 14 also prevents chips or chunks of foam material 12 from behaving like a granular material. That is, foam material 12 is suspended within fiber network 14 to prevent foam material from moving within a cover of a cushion, such as, for example, a pillow 18 that cushioning material 10 is positioned within.

Figure 4:
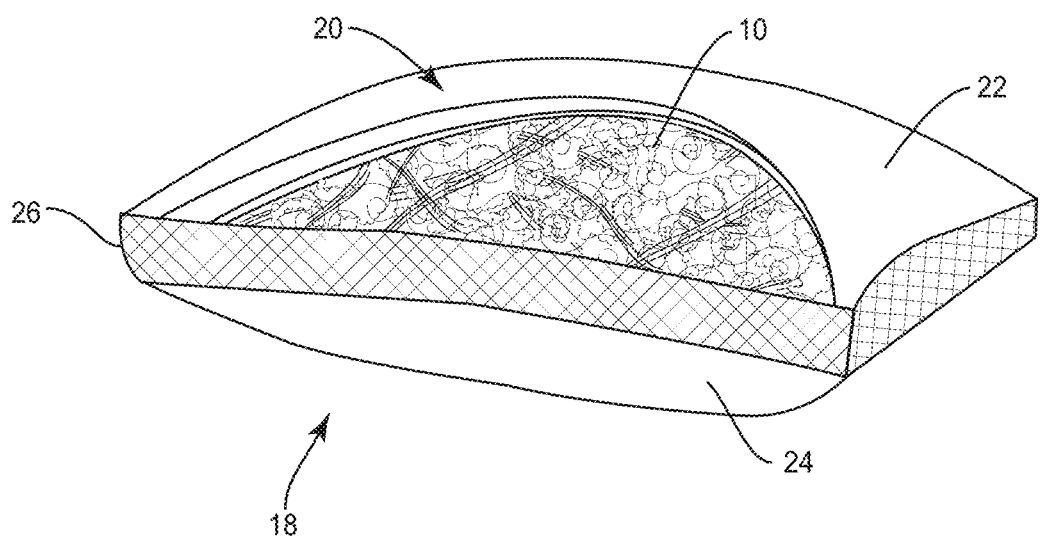
FIG. 4 is a perspective view of one embodiment of a cushion in accordance with the present principles of the present disclosure.

In one embodiment, shown in FIG. 4, pillow 18 includes a cover 20 with cushioning material 10 disposed therein. Cover 20 includes opposing first and second panels 22, 24 and a gusset 26 which perimetrically bounds, and joins, first and second panels 22, 24. In some embodiments, gusset 26 is formed of an open cell construction. First and second panels 22, 24 are sized and shaped to accept a user's head to provide support therefor. Gusset 26 has a total length that is equal to the length of peripheries of first and second panels 22, 24. Gusset 26 extends continuously about the entire periphery of each of first and second panels 22, 24.

Gusset 26 preferably is generally flat. In addition, it is preferred that gusset 26 have sufficient width to separate first panel 22 from second panel 24 so as to define an air flow channel therethrough. This, thus, allows for an open cell construction band to be defined about the pillow 18 between first and second panels 22, 24. With pressure and/or heat applied to one or both of first and second panels 22, 24, gusset 26 provides venting therethrough of the interior of cover 20. The venting may enhance the comfort of a user. With first and second panels 22, 24 preferably defining each a generally rectangular footprint common with gusset 26, gusset 26 is provided as four contiguous portions, including two longer longitudinal portions joined by two shorter end portions.

Cushioning material 10 functions with first and second panels 22, 24 and/or gusset 26 to provide breathability to pillow 18 to allow air to move in and out of pillow 18. For example, air can leave pillow 18 through gusset 26 when a user's head is positioned on panel 22 or panel 24. Air can enter pillow 18 through gusset 26 when the user's head is removed from panel 22 or panel 24. It is further envisioned that air can move in and out of pillow 18 as the user's head changes pressure on pillow 18.

In some embodiments, panel 22, panel 24 and/or gusset 26 are made from polyester and ultra-high weight molecular polyethylene. In some embodiments, panel 22, panel 24 and/or gusset 26 are made from between about 50% and about 75% polyester and between about 25% and about 50% ultra-high weight molecular polyethylene. In some embodiments, panel 22, panel 24 and/or gusset 26 are made from 67% polyester and 33% ultra-high weight molecular polyethylene. In some embodiments, panel 22, panel 24 and/or gusset 26 are made from between about 25% and about 75% phase change molecular viscose, between about 25% and about 50% ultra-high weight molecular polyethylene, and between about 10% and about 25% polyester. In some embodiments, panel 22, panel 24 and/or gusset 26 are made from between 50% phase change molecular viscose, 33% ultra-high weight molecular polyethylene, and 17% polyester.

Fibers 16 are opened as discussed herein to form fiber network 14. A large piece of foam is ground to form smaller chips or chunks of foam material 12. In some embodiments, foam material 12 is graded based on size and/or density, as discussed herein. The chips or chunks of foam material 12 are mixed with fiber network 14 such that the siliconized material of fibers 16 binds to foam material 12 to suspend foam material 12 within fiber network 14. In some embodiments, foam material 12 is mixed with fiber network in a controlled environment that maintains the humidity at a selected level. Indeed, it has been found that at least some humidity is required to provide a requisite amount of tackiness to allow the siliconized material of fibers 16 to bind to foam material 12. That is, when the humidity of the environment is below a certain threshold, the environment lacks enough moisture to provide the requisite amount of tackiness to allow the siliconized material of fibers 16 to bind to foam material 12. In some embodiments, the humidity of the environment is at least 25%, at least 40%, at least 50%, at least 60%, at least 70%, at least 80%, at least 90%, or greater than 90%.

Figure 5:
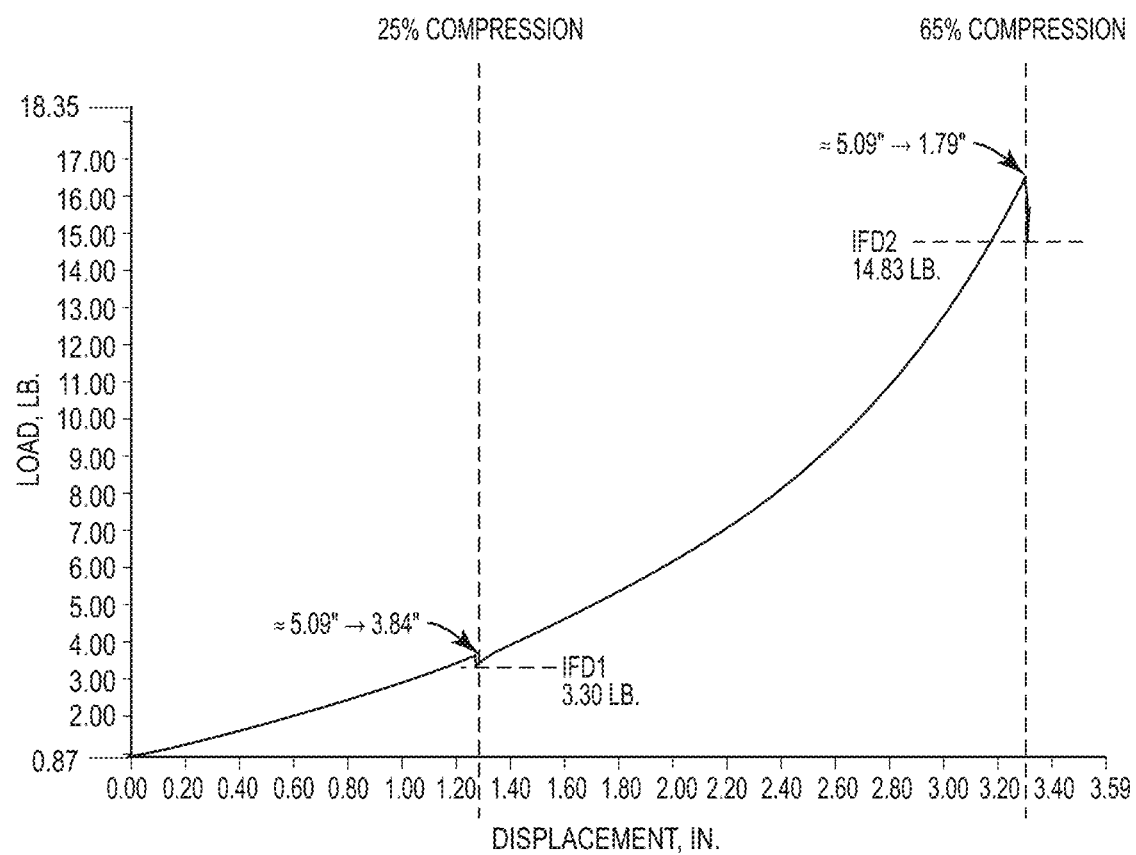
FIG. 5 is a graph illustrating results of a compression test.

Cushioning material 10 may be used to provide a selected amount of firmness to a cushion, such as, for example, pillow 18. For example, 3.3 lbs. of force was required to compress the height of pillow 18 by 25% (from 5.09" to 3.84") and 14.83 lbs. of force was required to compress the height of pillow 18 by 65% (from 5.09" to 1.79"), as shown in FIG. 5. The ratio of 65% lbs force to the 25% lbs. force, or support factor, can be used to provide a relative understanding of the difference in firmness or support between two different cushions. For example, a pillow that performs the same as pillow 18 may be made by using cushioning material 10 to form a pillow that has the same compression characteristics as pillow 18.

It will be understood that various modifications may be made to the embodiments disclosed herein. For example, features of any one embodiment can be combined with features of any other embodiment. Therefore, the above description should not be construed as limiting, but merely as exemplification of the various embodiments. Those skilled in the art will envision other modifications within the scope and spirit of the claims appended hereto.

What is claimed is:

1. A cushioning material comprising:
   a plurality of uncrimped fibers that define a fiber network; and
   a foam material suspended within the fiber network,
   wherein the cushioning material comprises about 20% of the fiber network by volume and about 80% of the foam material by volume,
   wherein the cushioning material is compressible from a first height to a second height that is about 25% of the first height, wherein a 25% force is required to compress the cushioning material from the first height to the second height, wherein the cushioning material is compressible from a third height to a fourth height that is about 65% of the third height, wherein a 65% force is required to compress the cushioning material from the third height to the fourth height, wherein the cushioning material has a support factor defined by a ratio of the 65% force to the 25% force, the ratio being about 4.5, and wherein the 65% force is about 14.0 lbs and the 25% force is about 3.0 lbs.

2. A cushioning material as recited in claim 1, wherein the fibers comprise a siliconized material.

3. A cushioning material as recited in claim 1, wherein the foam material comprises latex.

4. A cushioning material as recited in claim 1, wherein the foam material comprises viscoelastic polyurethane.

5. A cushioning material as recited in claim 1, wherein the foam material has a density between about 1.0 lbs/ft$^3$ and about 5.0 lbs/ft$^3$.

6. A cushioning material as recited in claim 1, wherein the foam material has a density between 1.8 lbs/ft$^3$ and 4.8 lbs/ft$^3$.

7. A cushioning material as recited in claim 1, wherein the foam material comprises chunks having a diameter between about 1.0 inch and about 2.0 inches.

8. A cushioning material as recited in claim 1, wherein the foam material comprises chunks having a diameter between 1.0 inch and 1.5 inches.

9. A cushioning material as recited in claim 1, wherein the fibers are made from polyester.

10. A cushioning material as recited in claim 1, wherein the fibers are made from a non-elastic material.

11. A cushioning material as recited in claim 1, wherein the fibers have a denier between about 0.5D and about 3.0D.

12. A cushioning material as recited in claim 1, wherein the fibers have a denier between about 0.9D and about 2.8D.

13. A method of making a cushioning material, the method comprising:

opening fibers to form a fiber network of uncrimped fibers; and blending a foam material with the fiber network such that the foam material is suspended within the fiber network, wherein the cushioning material comprises 20% of the fiber network by volume and 80% of the foam material by volume, wherein the cushioning material is compressible from a first height to a second height that is about 25% of the first height, wherein a 25% force is required to compress the cushioning material from the first height to the second height, wherein the cushioning material is compressible from a third height to a fourth height that is about 65% of the third height, wherein a 65% force is required to compress the cushioning material from the third height to the fourth height, wherein the cushioning material has a support factor defined by a ratio of the 65% force to the 25% force, the ratio being about 4.5, and wherein the 65% force is about 14.0 lbs and the 25% force is about 3.0 lbs.

14. A method as recited in claim 13, wherein opening the fibers allows free movement of the fibers around one another.

15. A cushioning material comprising:

a plurality of uncrimped fibers that define a fiber network, the fibers comprising polyester, the fibers have a denier between about 0.9D and about 2.8D; and a foam material permanently suspended within the fiber network, the foam material comprising latex or viscoelastic polyurethane, the foam material comprising chunks having a diameter between 1.0 inch and 1.5 inches, the foam material having a density between 1.8 lbs/ft$^3$ and 4.8 lbs/ft$^3$, wherein the cushioning material comprises 20% of the fiber network by volume and 80% of the foam material by volume, wherein the cushioning material is compressible from a first height to a second height that is about 25% of the first height, wherein a 25% force is required to compress the cushioning material from the first height to the second height, wherein the cushioning material is compressible from a third height to a fourth height that is about 65% of the third height, wherein a 65% force is required to compress the cushioning material from the third height to the fourth height, wherein the cushioning material has a support factor defined by a ratio of the 65% force to the 25% force, the ratio being about 4.5, and wherein the 65% force is about 14.0 lbs and the 25% force is about 3.0 lbs.

16. A cushioning material as recited in claim 1, wherein the foam material has a density between 2.7 lbs/ft$^3$ and 4.4 lbs/ft$^3$.

17. A cushioning material as recited in claim 1, wherein the cushioning material comprises 20% of the fiber network by volume and 80% of the foam material by volume.

18. A cushioning material as recited in claim 1, wherein the cushioning material comprises 30% of the fiber network by volume and 70% of the foam material by volume.

\* \* \* \* \*